United States Patent Office.

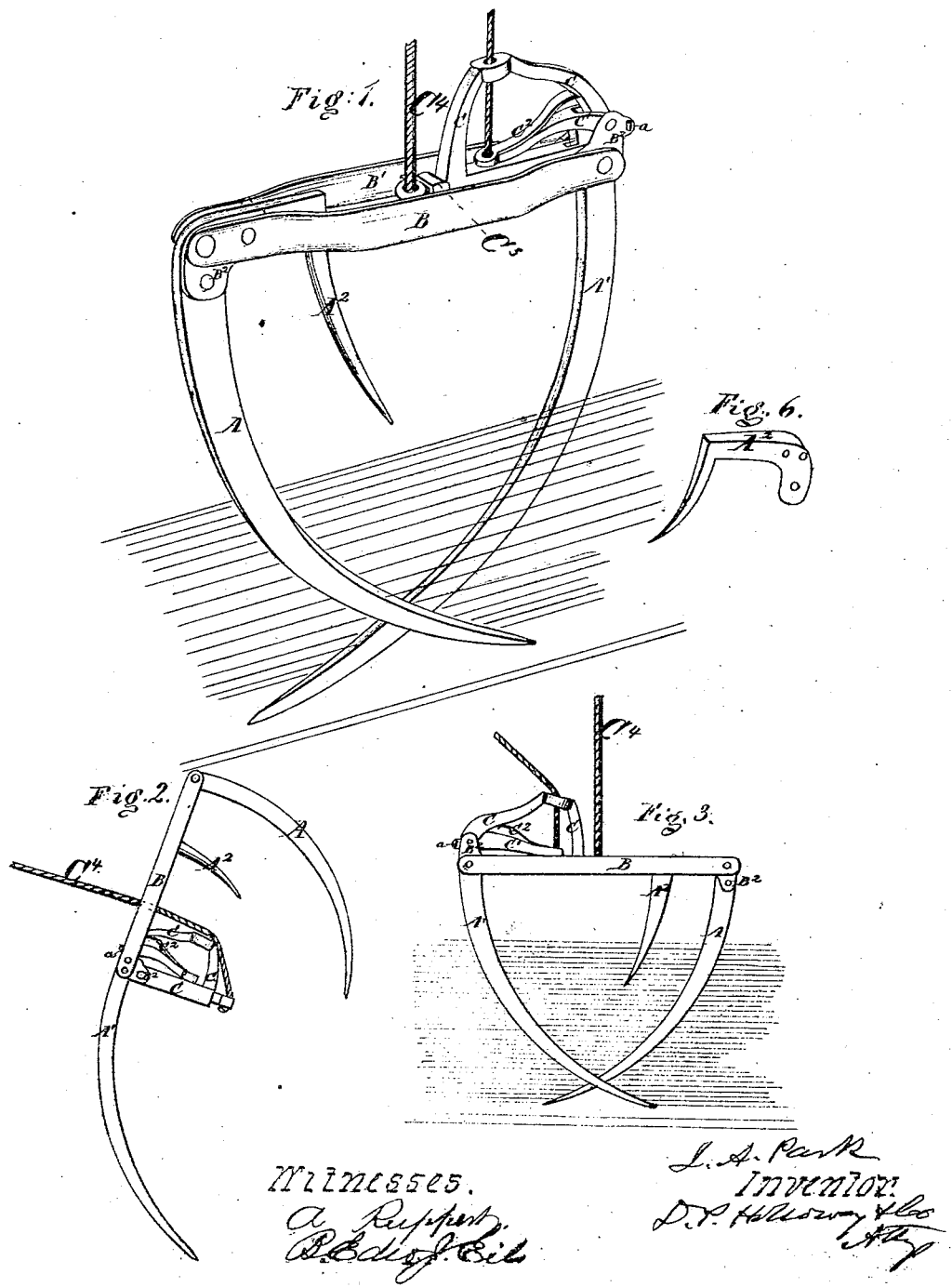

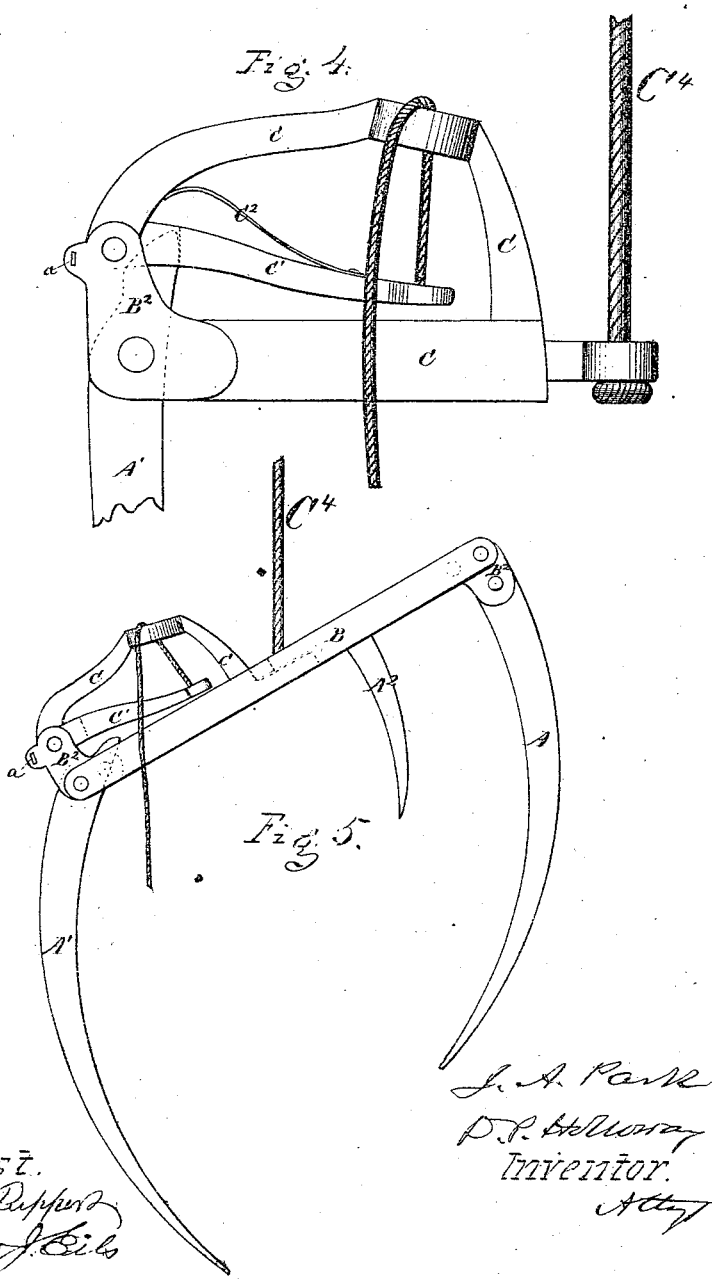

JAMES A. PARK, OF LANSING, MICHIGAN, ASSIGNOR TO HIMSELF AND WILLIAM WOODHOUSE.

*Letters Patent No. 96,474, dated November 2, 1869.*

IMPROVEMENT IN HORSE HAY-FORKS.

The Schedule referred to in these Letters Patent and making part of the same.

*To all whom it may concern:*

Be it known that I, JAMES A. PARK, of Lansing, in the county of Ingham, and State of Michigan, have invented a new and useful Improvement in Horse Hay-Forks; and I do hereby declare that the following is a full, clear, and exact description thereof, reference being had to the annexed drawings, making part of this specification, in which—

Figure 1 is a perspective view of my improved fork, showing how it appears when it has been inserted into the hay and raised a short distance from the floor upon which the hay rested, the lines showing the hay resting upon the prongs of the fork, and that the same has been taken up clean from the floor or wagon-bottom.

Figure 2 is an elevation of the fork, showing the position of the parts when it is in readiness to be inserted into the hay for the purpose of elevating the same, in which condition it may also be used to gather together any scattering quantities of hay which may remain upon the floor preparatory to its being elevated to the mow.

Figure 3 is a sectional elevation of the fork as it appears when it has been inserted into the hay, the swinging prong brought into position, and there held by the hoisting-rope which controls it, and the fork has commenced to rise. The lines in this figure also show that the hay has been taken from the floor upon which it rested without leaving any to be taken away by the common fork or by any other means.

Figure 4 is a vertical side elevation of the locking-device and a portion of the swinging prong, showing also the means of joining the same to the cross-bars, and the ropes for lifting and unlocking the fork.

Figure 5 is a side elevation, showing the position which the parts assume directly after unlocking the swinging prong when the fork is loaded with hay.

Figure 6 is a perspective view, showing how a supplemental prong of the fork may be constructed when one is used.

Corresponding letters refer to corresponding parts in the several figures.

Hay-forks of this class, as they have been heretofore constructed, have been subject to various serious objections, one of which has been that they have not been capable of being so used that the hay or other material to be raised could be taken up clean from the floor or wagon.

Other serious objections have arisen, from the fact that the locking-device, which holds the fork in position to hold the hay, has not been so constructed as to render it easy to insert the fork, so as to bind the hay, and at the same time lock it without difficulty; nor has there been a means provided heretofore whereby the fork could be locked when out of the hay, and thus be rendered capable of being inserted so as to compress the hay with a pressure equal to the weight of the operator, and to further bind it by applying the hoisting-rope in such a manner that it tends to do so.

The object of the inventor, in this instance, is to remove the objections at present existing to this class of devices—among which are those above named—and to this end, The invention consists in the construction, combination, and arrangement of the parts of which the fork is composed, as will be more fully described hereinafter.

To enable those skilled in the art to make and use my invention, I will proceed to describe its construction and operation.

A, in the drawings, represents the fixed prong of the fork, which is to be made of metal, and is to be of the required length and dimensions otherwise to adapt it to the position in which it is to be used. This prong is to be curved substantially as shown in figs. 1, 2, 3, and 5 of the drawings, or so that when it is inserted in the hay, and the locking-device has been brought to the position shown in figs. 1 and 3, its point shall have crossed or passed by the point of the swinging prong soon to be described.

The upper end of this prong is to be rigidly secured to the cross-bars B B$^1$ by means of the corner-irons B$^2$.

A$^1$ represents the swinging prong of the fork, which is pivoted to the cross-bars B B$^1$, at a point near its upper end, that portion which extends above or beyond this pivoted point being bevelled or formed substantially as shown in figs. 4 and 5, to enable it to pass into a slot in the end of lever C$^1$. That portion of this prong which is below this pivoted point should be of the same dimensions and form substantially as the fixed prong above described.

A$^2$ represents a supplemental prong, which is designed, when used, to aid in securing the hay properly between the other prongs of the fork. It may be constructed as shown in the drawings, and thus be made to constitute a portion of the fixed prong, or it may be constructed with projections upon two of its sides and its upper end, which projections may extend through the cross-bars B B$^1$, to which it may be riveted, and by which it will be held in position.

It is evident that this prong is not at all indispensable to the successful working of the fork, it working equally well in most cases without it.

B B$^1$ represent cross-bars, which extend from one upper end of the prongs to the other, the distance being such as is required to give the fork any required capacity. These bars are to be of metal, and are to be bent outward at their central portions, as shown in fig. 1, so as to give room for the locking-device to pass freely between them, and at the same time afford room for the cross-stop C$^3$, which receives the locking-device, and stops its motion.

B² represents angle or corner-irons, which are attached to the outer ends and inside surfaces of the cross-bars, and to the fixed prong at the end where such prong is located, and to the cross-bars and to the swinging prong at the other end, the upper and vertical portion at this end serving as parts to which to pivot the lever C¹.

To the upper outer surfaces of these irons there is a projection or projections, attached in such a manner as to act as stops to the swinging prong of the fork, and prevent its opening too far or beyond the position shown in fig. 2.

C represents a frame, of metal, which constitutes a portion of the locking-device, it consisting of two bars of metal, the outer ends of which are pivoted to the outer ends of the cross-bars, from which point they extend inward to or a little past the centre of the same, where they terminate in a socket for the reception of a rope or chain with which to elevate the fork.

From near the inner end of this frame there rises a bar of metal, which extends upward for some distance, and is then curved outward, and is carried backward, and pivoted to the corner-irons, to which the cross-bar and the upper end of the swinging prong of the fork are attached.

In the upper curved portion of this frame there is to be an aperture for the passage of a rope or cord, the lower end of which is attached to a lever for unlocking the device from the swinging prong of the fork.

C¹ represents a lever, the outer end of which is bifurcated to receive the outer end of the curved bar of the frame above alluded to, it being pivoted to the upper end of the corner-irons B², the construction of which is shown in fig. 1. This lever extends inward from its pivoted point for a distance sufficient to bring its inner end opposite the aperture in the curved portion of the frame above described, at which point it is provided with a socket for the reception of a rope with which to operate it, for the purpose of unlocking the frame C from the swinging prong A¹.

C² represents a spring, which may be attached to the end of the lever, and afterward curved upward, so that its upper end shall rest upon or against the curved bar of frame C, so that as the lever is raised for the purpose of unlocking the device, the spring shall immediately act to return the lever to its original position.

C⁴ represents the rope which is to be attached to the socket in the outer end of frame C, and is to extend from such point to any suitable device for raising the fork and its load.

C³ represents a cross-stop, which is attached to the cross-bars B B¹, it extending across from one to the other, and having a notch or recess in it for the reception of the end of frame C, its office being to arrest the motion of such frame when it has assumed a horizontal position, or a position in line with the cross-bars B B¹.

The arrangement of this locking-device is such that when the parts are in the position shown in fig. 1, the swinging prong of the fork is held in position by it, and the weight of the hay which is between the prongs will rest equally upon both, and consequently the fork will be acted upon centrally by the rope C⁴, and may be carried to any desired point, when the rope or cord in the end of the lever is to be pulled upon, which will release the swinging prong from the lever C¹, and permit the weight of the hay to facilitate its own discharge from the fork.

When the parts are in the position shown in fig. 2, they are in readiness to be inserted into the hay to be raised, and the prong A¹ may be inserted until the frame C comes in contact with the surface of the hay, which frame will serve as a guide for the depth to which such prong is to be inserted.

The frame having been previously locked to the prong, power is applied to the rope C⁴, which has the effect to compress the hay between the prongs A and A¹, and bring the parts into the position shown in fig. 3.

While the fork is being inserted and arranged for being raised, the operator may stand upon frame C, it affording a suitable place for him.

Having thus described my invention, and the manner of operating the same,

What I claim, and desire to secure by Letters Patent, is—

1. The combination, in a hay-fork, of a fixed prong, A, rigidly attached to the cross-bars B B¹, a swinging prong, A¹, which is pivoted to said cross-bars and to the locking-frame, and a lever for unlocking the swinging prong, all constructed and operating substantially as and for the purpose set forth.

2. The combination of the cross-bars B B¹, the swinging prong A¹, corner-irons B², frame C, lever C¹, and rope or chain C⁴, substantially as and for the purpose set forth.

3. The combination and arrangement of the corner-irons B² and cross-bars B B¹, substantially as and for the purpose set forth.

4. The arrangement of the frame C, lever C¹, and spring C², with reference to the swinging prong A¹, it being such that when the hoisting-rope is made to draw on the fork, the parts are thereby locked to each other, but not to the cross-bars, substantially as and for the purpose specified.

5. The frame C, constructed substantially as and for the purpose set forth.

6. In combination with the frame C and cross-bars B B¹, the stop C³, substantially as and for the purpose set forth.

In testimony whereof, I have signed my name to this specification, in the presence of two subscribing witnesses.

JAMES A. PARK.

Witnesses:
EDM. F. BROWN,
B. EDW. J. EILS.